IMPEDANCE NETWORK SYSTEM

Filed March 27, 1964 4 Sheets-Sheet 1

INVENTOR.
TENNY LODE
BY
Dugger Braddock Johnson & Westman
ATTORNEYS

INVENTOR.
TENNY LODE
BY
Dugger, Braddock, Johnson & Westman
ATTORNEYS

IMPEDANCE NETWORK SYSTEM

Filed March 27, 1964 4 Sheets-Sheet 3

INVENTOR.
TENNY LODE
BY
Dugger, Braddock, Johnson & Westman
ATTORNEYS

IMPEDANCE NETWORK SYSTEM

Filed March 27, 1964 4 Sheets-Sheet 4

INVENTOR.
TENNY LODE
BY
Dugger, Braddock, Johnson & Westman
ATTORNEYS

United States Patent Office 3,354,401
Patented Nov. 21, 1967

3,354,401

IMPEDANCE NETWORK SYSTEM

Tenny Lode, Mankato, Minn., assignor to Rosemount Engineering Company, Minneapolis, Minn., a corporation of Minnesota Filed Mar. 27, 1964, Ser. No. 355,275
11 Claims. (Cl. 330—10)

ABSTRACT OF THE DISCLOSURE

A circuit for the generation of a voltage or current signal as a function of one or more variable resistances or impedances is provided. A principal application is in combination with variable resistance transducers for the generation of DC electrical signals corresponding to temperature, strain or other physical quantities. The circuit functions as a form of carrier amplifier, in which all chopping or modulation is performed on high level signals. The absence of low level DC signals within the system effectively eliminates errors due to thermoelectric voltages, as well as those due to chopping or modulation of low level DC signals.

This invention has relation to a circuit for the generation of a voltage or current signal as a function of one or more variable resistances or other impedances. A principal application of the teachings of the invention is in combination with variable resistance transducers for generation of DC electrical signals corresponding to temperature, strain, or other physical quantities or conditions.

In a circuit made according to one form of the present invention, a first alternating signal is passed through a transducer, more specifically a variable attenuator, to produce a second alternating signal. The difference between this second signal and a third modulated alternating signal is AC amplified, demodulated, and DC amplified. This resulting DC signal is modulated in step with the first alternating signal to produce the aforementioned third alternating signal which is summed with the second alternating signal and then fed to the AC amplifier. Thus the resulting DC signal is an exact function of the signal originally derived from the variable attenuator.

*Prior art*

To obtain a voltage or current signal which is a function of one or more variable impedances, a usual present practice is to apply a standard voltage or current to an impedancee network which includes the variable impedance element or elements of a variable attenuator, and to accept the voltage or current output from this network as a convenient measure of the transducer impedance.

DC voltage inputs and outputs are most commonly used, and amplifiers are usually necessarily employed to provide suitable, usable signal levels. Such DC amplifiers, however, cause problems in that their output is not necessarily zero when the input is zero. The apparent input voltage when the actual input voltage is zero is referred to as the input offset voltage. In order to avoid such an input offset voltage, a chopper or carrier amplifier system can be used. In such a conventional carrier amplifier system, a standard DC voltage is applied to a variable attenuator, a transducer network for example, and the difference between the variable attenuator output and a signal proportional to the DC amplifier output is modulated into an AC signal, AC amplified, demodulated, and applied to the input of the DC amplifier. The circuit is thus a feed-back system in which the DC amplifier will be driven such that its output will be essentially proportional to the output of the variable attenuator.

While such carrier amplifiers present a distinct improvement over simple direct coupled DC amplifiers, they present problems in precision measurement applications. For example, for systems in which the output of the transducer network is on the order of a few millivolts, thermoelectric potentials in the input and/or chopper circuits or unbalance in a semi-conductor modulator may introduce significant errors.

In a circuit made according to the present invention, all chopping or modulation is performed on high level signals. The absence of low level DC signals within the system effectively eliminates these errors due to thermoelectric voltages, as well as those due to chopping or modulation of low level DC signals.

Figures 1, 2:
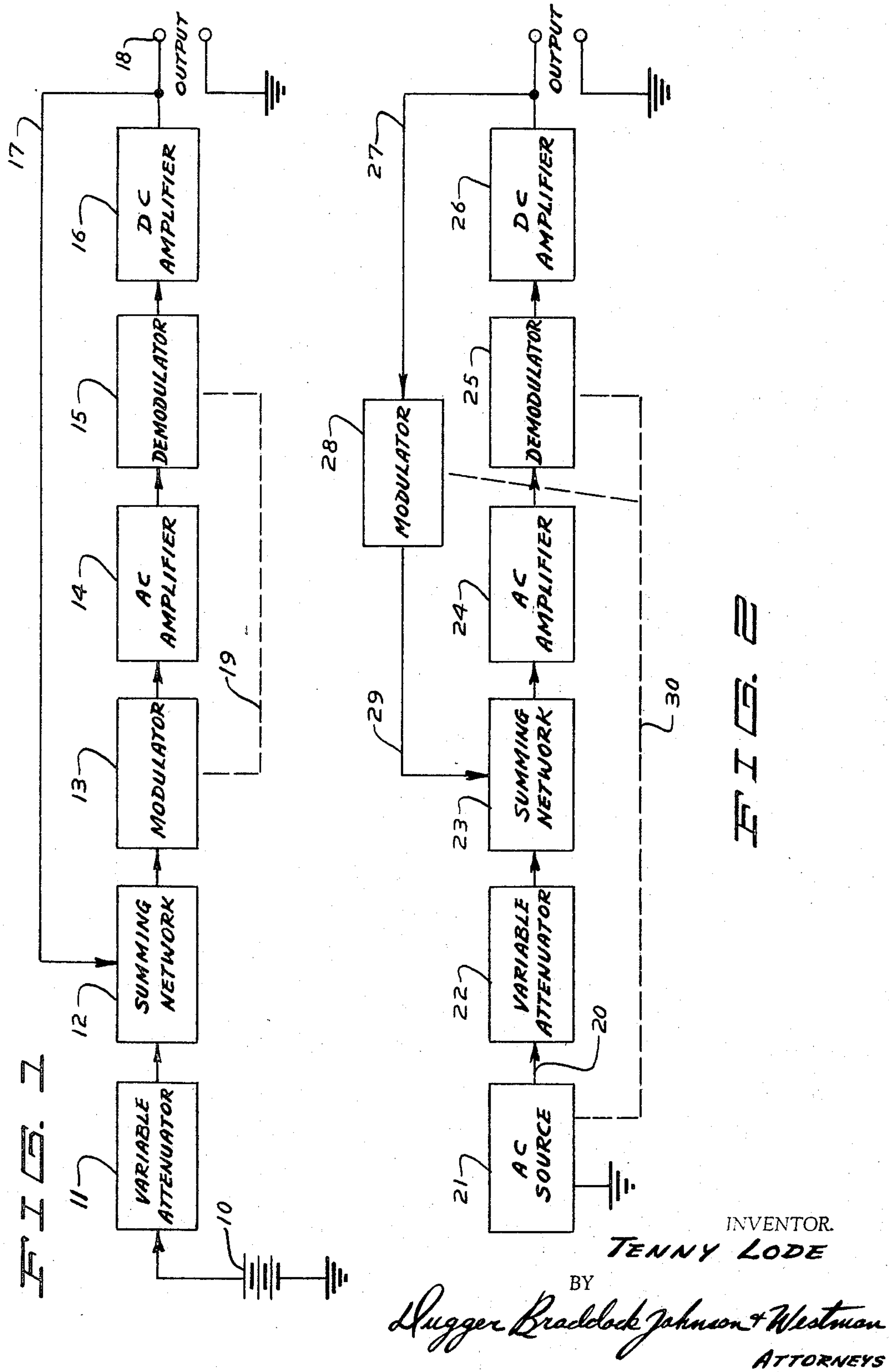
FIG. 1 is a block diagram of a conventional carrier amplifier system made in accordance with the prior art.
FIG. 2 is a block diagram of an impedance network system of the present invention.

Referring to the drawings and the numerals of reference thereon, and first referring specifically to the conventional carrier amplifier system of the prior art as illustrated in FIG. 1, a standard DC voltage 10 is applied to a variable attenuator 11 which, for example, can be a transducer network. The difference between the variable attenuator output and a signal proportional to the output of a DC amplifier 16 is arrived at in the summing network 12 and this difference is modulated into an AC signal by a modulator 13, amplified in an AC amplifier 14, demodulated in the demodulator 15, and amplified by the DC amplifier 16.

As shown and stated, the resulting DC amplifier output signal is fed back to the summing network 12 through line 17. This circuit is thus a feed-back system in which the DC amplifier 16 will be driven such that its output 18 will be essentially proportional to the output of the variable attenuator 11. The dotted line 19 connecting the modulator 13 and the demodulator 15 represents AC coupling to maintain frequency and phase synchronization for modulation and demodulation.

As pointed out above, there are problems in the use of such conventional carrier amplifier systems in precision measurement applications. For example, for systems in which the output of the transducer network is of the order of a few millivolts, thermoelectric potentials in the output and/or chopper circuits or unbalance in a semiconductor modulator can introduce significant errors. Such errors can be effectively eliminated by use of the system of the invention as illustrated, for example, in FIG. 2.

Referring now to FIG. 2, an impedance network system of the present invention can include an AC source 21 feeding through line 20 to a variable attenuator 22 to provide an AC signal to summing network 23. The signal from the summing network is fed to an AC amplifier 24 where it is amplified and fed to a demodulator 25 whose output is amplified in DC amplifier 26. This amplified DC output is fed through line 27 to a modulator 28, and the output from this modulator is fed back to the summing network 23 through the line 29 where it is combined with the signal from the variable attenuator in such a manner that the signal from the summing network 23 to the AC amplifier 24 is the difference between these input signals to the summing network. The dotted line 30 represents AC coupling to maintain frequency and phase synchronization between AC power source 21, the modulator 28, and demodulator 25.

With suitable high gain amplifiers, the gain of the system is determined primarily by the relative proportions of the variable attenuator output and DC amplifier output signals in the output of the summing network. Suitable filtering to average and smooth the demodulated difference signal is provided in the demodulator and/or in the DC amplifier. The modulator is assumed to be a symmetric amplitude modulator whose AC output corresponds in amplitude and phase (with respect to the phase of a reference AC signal) with the magnitude and polarity of the DC or low frequency input signal. The demodulator is assumed to be a synchronous or phase sensitive demodulator whose DC or low frequency output corresponds in magnitude and polarity to the magnitude and phase (with respect to said reference AC signal) of the AC input. This reference AC frequency may be generated within the modulator or demodulator or supplied from an external source. Electromechanical, moving contact devices can be effectively employed as modulators and demodulators in such circuits with modulation frequencies up to approximately 400 cycles per second. Transistor and diode switching circuits are used with modulation frequencies of up to 10 kilocycles and higher.

Since there are no low level DC information signals, the system of FIG. 2 is insensitive to thermoelectric, offset and other spurious DC voltages.

Figures 3, 5:
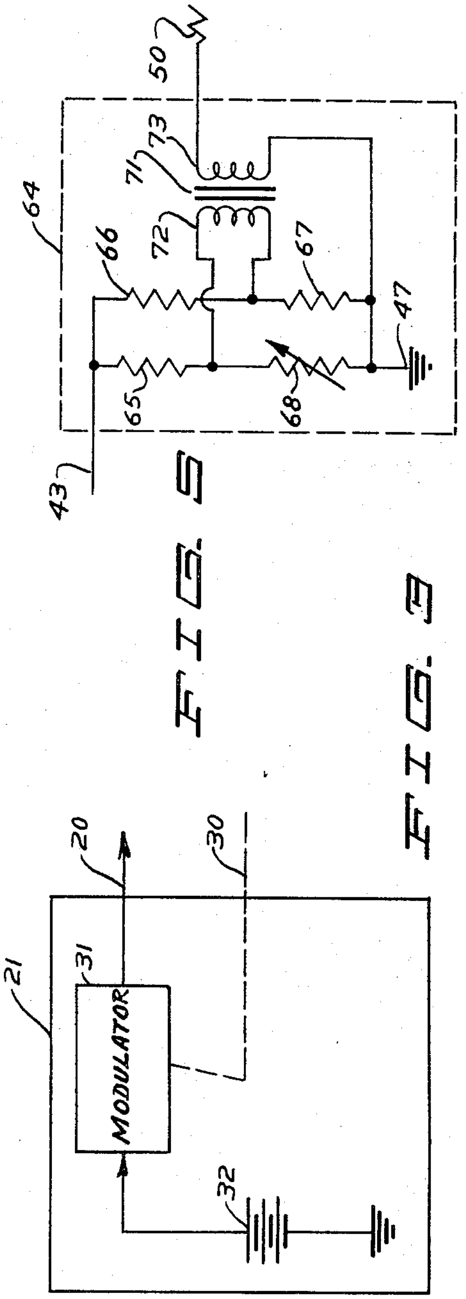
FIG. 3 is a schematic representation of a specific form of AC source for use in the system of FIG. 2.
FIG. 5 is a circuit diagram of an alternate form of variable attenuator for use in place of the variable attenuator illustrated in FIG. 4.

FIG. 3 shows one specific form of AC source 21 for use in FIG. 2. This source includes a modulator 31 into which the voltage of a standard DC source 32 is fed and from which an alternating signal is fed on line 20. The AC coupling is represented by the dotted line 30 as was explained in connection with FIG. 2.

Figure 4:
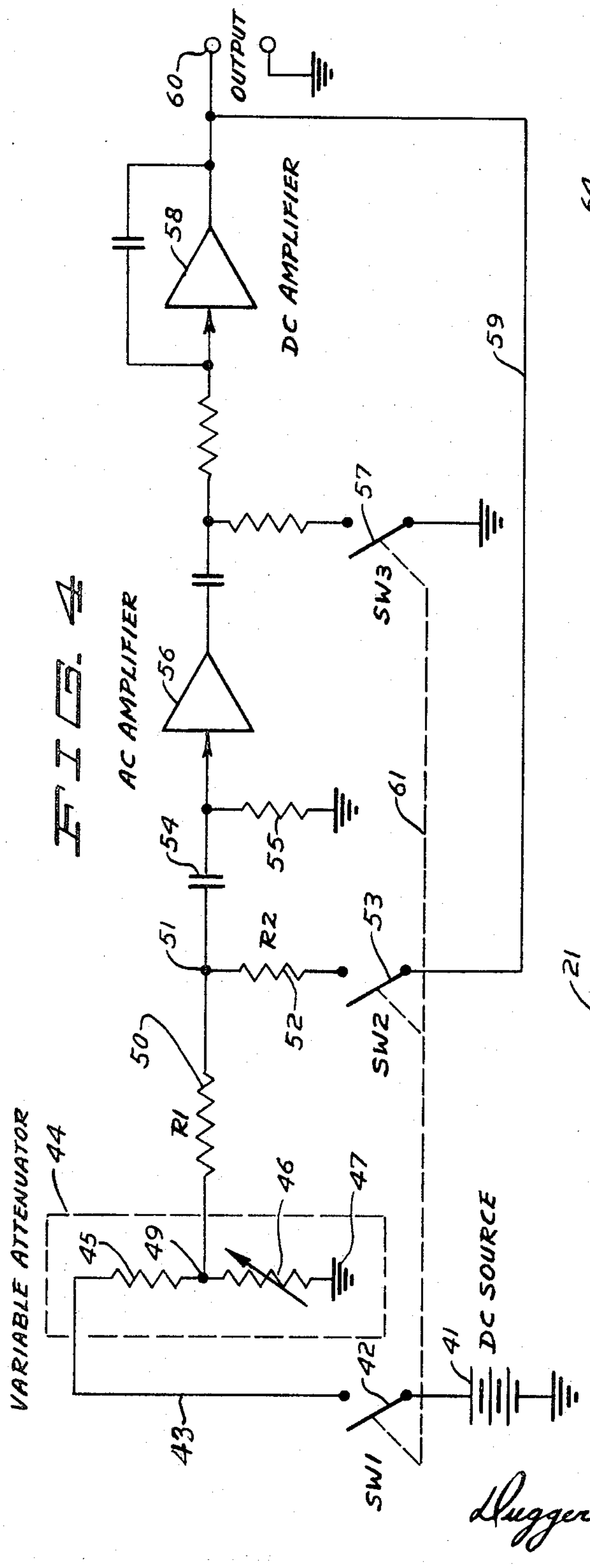
FIG. 4 is a schematic circuit diagram of a specific system utilizing the principles disclosed in FIG. 2.

A high level modulation circuit specifically illustrating the system of FIG. 2 is shown in FIG. 4. As shown in this figure, the AC source equivalent to that illustrated at 21 in FIG. 2 consists of a DC source or battery 41 and a first chopper switch 42 which feed through a line 43 to a variable attenuator 44 which includes, as shown, a fixed resistor 45 and a variable resistor 46 which, in the case of a transducer, will be varied in accordance with physical conditions to which it is subjected. As shown, the variable resistor 46 is grounded as at 47. The DC source 41 is also grounded. An electrical connection from a common point 49 between the two resistors leads to a summing resistor 50 of a summing network to a common point 51 which is connected to a summing resistor 52. This resistor 52 is in position to receive a signal from a modulator which includes or consists of a second chopper switch 53. Input to this chopper switch 53 will be described subsequently.

The signal at the common point 51 is fed through a capacitor 54 and across a resistor 55 to an AC amplifier 56, and a signal from this amplifier is synchronously demodulated through the instrumentality of third chopper switch 57. This signal is fed to a DC amplifier 58 acting as an integrator to provide amplification, filtering and smoothing of the demodulated signal. This DC output signal is fed through line 59 to second chopper switch 53 which modulates it into a pulsating signal which normally opposes the pulsating output of the variable attenuator.

The AC amplifier 56 and the DC amplifier 58 are inverting amplifiers and may be of the type typically or commonly employed in electronic analog computing and simulation systems. With suitable high gain amplifiers, the overall gain of the circuit of FIG. 4 is determined primarily by therelative values of the summing resistors 50 and 52. Dotted line 61 represents a mechanical link between the chopper switches 42, 53, and 57 to operate them in step with each other.

In FIG. 5 a variable attenuator 44 in the circuit of FIG. 4 is illustrated. Identical parts in FIGS. 4 and 5 are identically numbered. In the circuit of FIG. 5, line 43 from the AC source extends to a bridge circuit including fixed resistors 65, 66, and 67 and 68. The bridge is grounded as at 47, and the output of the bridge feeds through a primary 72 of a transformer 71, and a secondary 73 of said transformer is grounded as at 47 and is connected to first summing resistor 50 as is the output from the variable attenuator 44 in FIG. 4.

The bridge circuit of FIG. 5 is such that the bridge output will normally be zero for a nominal value of the variable resistance element 68. The magnitude and phase of the bridge output will then depend on the magnitude and direction of the deviation of the variable resistance element 68 from its nominal value.

Figure 6:
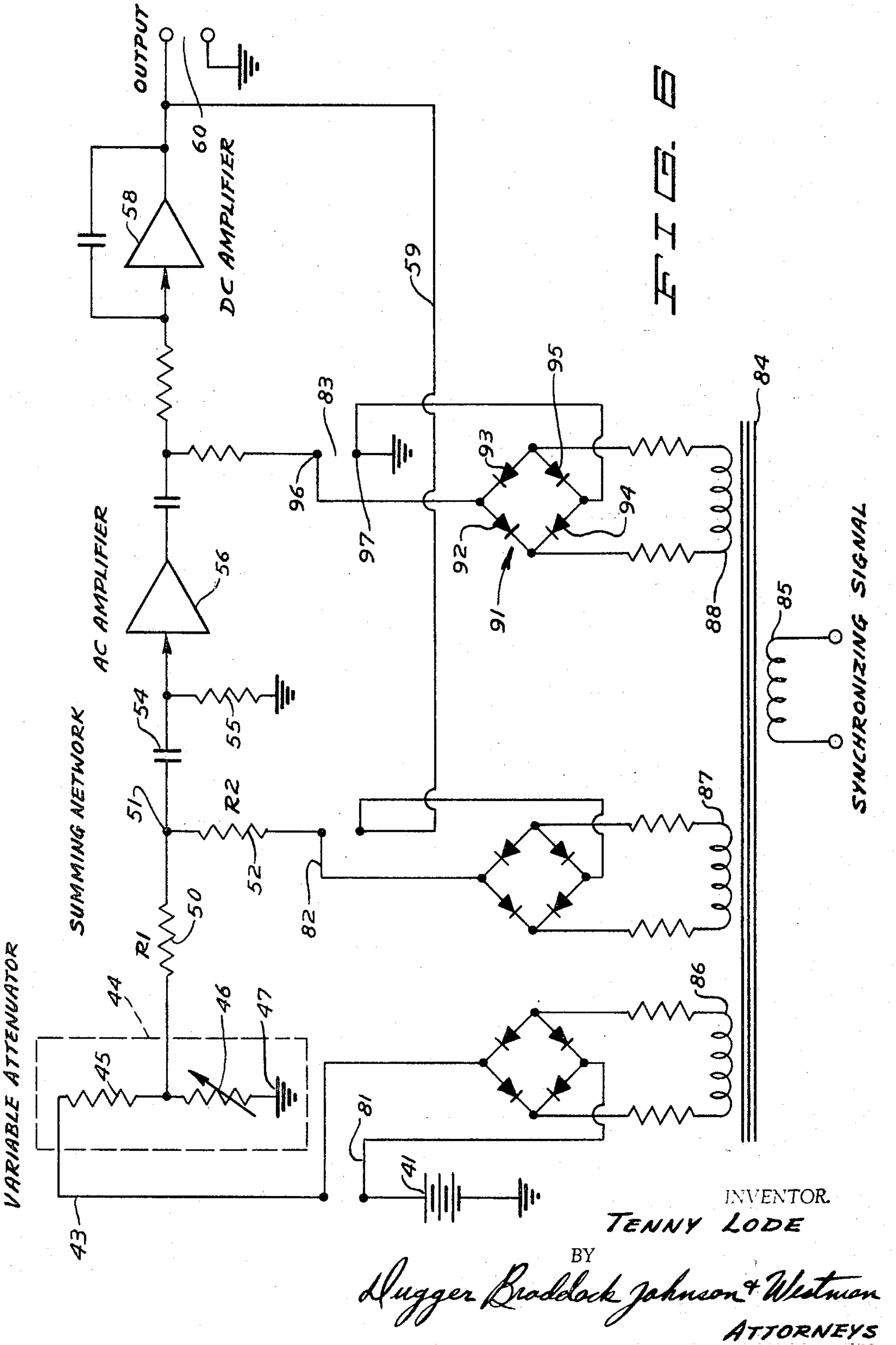
FIG. 6 is a schematic circuit diagram of the system of FIG. 4, but utilizing an alternate form of chopper to replace the mechanically coupled chopper switches of that figure.

Referring now to FIG. 6, a schematic diagram is shown which is identical with that shown in FIG. 4 with the exception of the fact that first, second and third chopper switches 42, 53, and 57 are replaced with solid state diode switches 81, 82 and 83, respectively. The identical parts in FIGS. 4 and 6 are identically numbered. A transformer 84 having a primary winding 85 controls the switching of each of the switches 81, 82, and 83 through the instrumentality of secondary windings 86, 87 and 88.

Referring to switch 83, which is typical of these structures, during one-half of the cycle of the electrical signal impressed on bridge 91, diodes 92 and 93 will be conducting as will be diodes 94 and 95. The apparent resistance between terminals 96 and 97 will be extremely low, thus allowing switch 83 to act as if it were closed.

On the opposite half of the cycle, the diodes will be biased in reverse direction and will be nonconducting and the resistance between terminals 96 and 97 will be extremely high thus constituting the opened condition of the switch 83.

In addition to the two types of switching illustrated in FIGS. 4 and 6, respectively, it is to be understood that other electromechanical switches, solid state diode and/or transistor switching devices or other structures can be used effectively.

Figure 7:
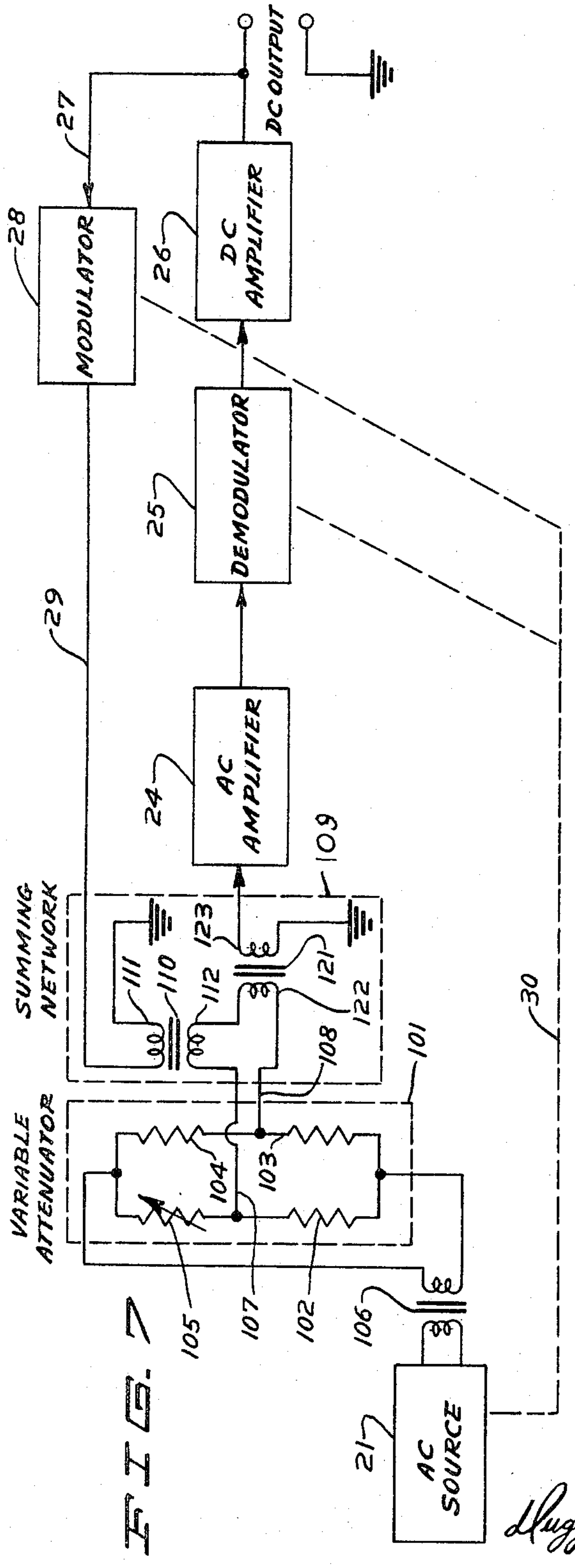
FIG. 7 is a block and circuit diagram of the invention as illustrated in FIG. 2 showing a particular form of variable attenuator and showing a transformer coupled summing network.

Referring now to FIG. 7, a block and circuit diagram of the invention of FIG. 2 is illustrated showing a particular form of variable attenuator similar to that disclosed in FIG. 5, but showing also a transformer coupled summing network. In this figure, elements equivalent to or identical with the elements shown in the block diagram of FIG. 2 are identically numbered. Thus an AC source 21 feeds a variable attenuator and a summing network is fed by this attenuator and the modulated DC output signal, the resulting signal being fed successively to an AC amplifier 24, a demodulator 25 and a DC amplifier 26, the output from the DC amplifier being fed back through line 27 to modulator 28 and from that modulator to line 29 and the summing network. Line 30 again indicates the AC coupling between AC source 21, demodulator 25 and modulator 28.

A variable attenuator 101 includes three fixed resistors 102, 103 and 104 and a variable resistor 105 connected as a transducer bridge. Input to this attenuator comes through a transformer 106 from AC source 21, and output from the attenuator is fed to a summing network 109 through lines 107 and 108.

A transformer 110 is provided with a primary 111 which receives its output from line 29 carrying the modulated DC output signal. This signal is transmitted to the transducer network through the instrumentality of secondary winding 112. Output of the transducer bridge and of the normally bucking feed-back signal is transmitted to the AC amplifier 24 through the instrumentality of a transformer 121 having a primary 122 in series with the secondary 112 of transformer 110, both of these windings being connected across the transducer bridge circuit. A secondary winding 123 of the transformer 121 actually transmits the signal from the summing network to the AC amplifier 24.

When the AC amplifier 24 is of high gain, this system normally operates in a null condition such that the AC voltage developed by the variable attenuator 101 is essentially opposed by the fed-back chopped output voltage. Thus, little or no current will flow in the input circuit, and the apparent load resistance presented to the transducer network or variable attenuator 101 will be extremely high. This is a voltage balance system as compared with the circuit of FIG. 4 which is a current balance system. In addition, the various transformers cause the input, output and power supply circuits to be DC isolated from each other.

Figure 8:
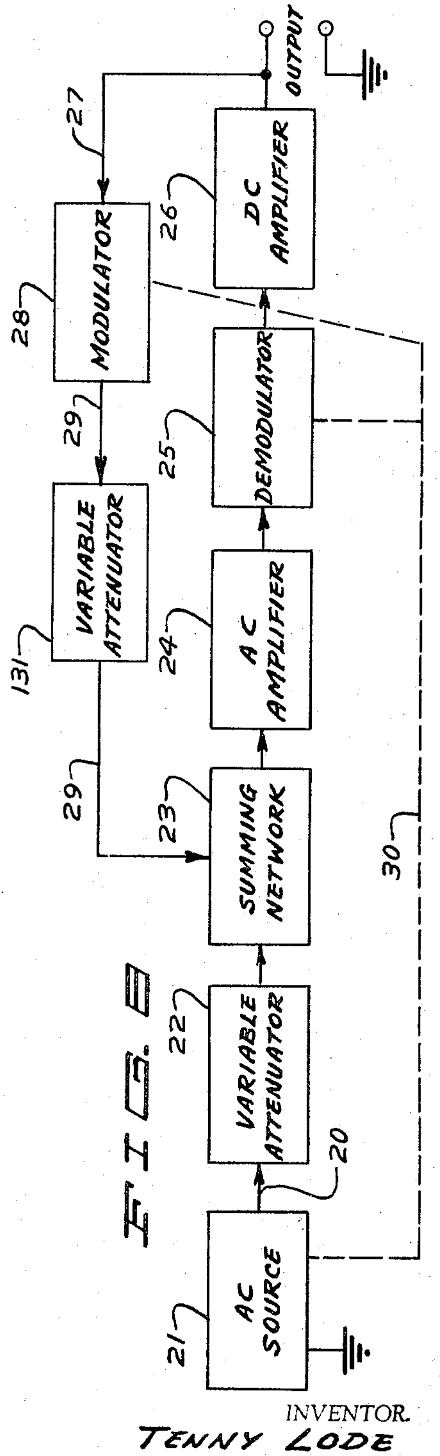
FIG. 8 is a block diagram of a modified form of the present invention.

An additional form of the invention is illustrated in the block diagram of FIG. 8. In this figure elements identical with the disclosure in the block diagram of FIG. 2 are identically numbered. An additional variable attenuator 131 has been positioned adjacent modulator 28 so that the modulated output of DC amplifier 26 is itself modulated in accordance with the impedance variations of variable attenuator 131. As previously pointed out, the DC output of the circuit of FIGS. 2 and 8 will be generally proportional to the coupling ratio of the variable attenuator 22. The circuit output voltage will be inversely proportional to the coupling ratio of the variable attenuator 131 in FIG. 8 whenever the coupling ratio of attenuator 22 is held constant or deleted from the circuit. Thus the voltage output can be proportional to the coupling ratio of variable attenuator 21 divided by the coupling ratio of variable attenuator 131. As will readily be seen, this circuit will be useful in generating inverse and quotient functions of conditions imposed on the transducer which constitute the variable impedance elements of the attenuators 22 and 131.

What is claimed is:

1. An impedance network system for generating electrical signals which are a function of the impedance of a variable impedance element, said system including a variable attenuator having an element of variable impedance, said variable attenuator having an input section and an output section; means for impressing a first pulsating electrical signal at a particular frequency on said attenuator input section to produce at said output section a second electrical signal which is representative of a function of the impedance of said variable impedance element; a summing network having first and second input sections and an output section, said attenuator output section feeding said first summing network input section; an AC amplifier having an input circuit fed from said summing network output section and having an output circuit; a demodulator stage having an input section fed from said AC amplifier output circuit and having an output section; a modulator including an input section fed from said demodulator output section, an output section, and further including means therewith to modulate electrical signals impressed on said modulator input section with a pulsating electrical signal at said particular frequency and to impress said modulated signals on said output section; means to feed said signals from said modulator output section to said second input section of said summing network in bucking relationship to said second electrical signal at said first summing network input section; and means in said demodulator stage for removing the pulsating signal components at said particular frequency from the electrical signals impressed on said demodulator stage input section to provide a DC signal at the output section of said demodulator stage.

2. An impedance network system for generating electrical signals which are a function of the impedance of a variable impedance element, said system including a variable attenuator having an element of variable impedance, said variable attenuator having an input terminal and an output terminal; means for impressing a first pulsating electrical signal at a particular frequency on said attenuator input terminal to produce at said attenuator output terminal a second elecrical signal which is representative of a function of the impedance of said variable impedance element; a summing network having first and second input terminals and an output terminal, said attenuator output terminal feeding said first summing network input terminal; an AC amplifier having an input circuit fed from said summing network output terminal and having an output circuit; a demodulator stage having an input terminal fed from said AC amplifier output circuit and having an output terminal; a DC amplifier having an input circuit fed from said demodulator output terminal and having an output circuit; a modulator including an input terminal fed from said DC amplifier output circuit, an output terminal, and further including means therewithin to modulate electrical signals impressed on said modulator input terminal with a pulsating electrical signal at said particular frequency and to impress said modulated signals on said output terminal; means to feed said signals from said modulator output terminal to said second input terminal of said summing network in bucking relationship to said second electrical signal at said first summing network input terminal; and means in said demodulator stage for removing the pulsating signal components at said particular frequency from the electrical signals impressed on said demodulator stage input terminal to provide a DC signal at the output section of said demodulator stage.

3. The combination as specified in claim 2, a second variable attenuator having a second element of variable impedance, said second attenuator having an input terminal and an output terminal; and wherein said means to feed signals from said modulator output terminal to said second input terminal of said summing network includes said second attenuator, said modulated signal from said modulator output terminal being fed to said input terminal of said second attenuator to produce at said second attenuator output terminal an electrical signal which is representative of a function of the impedance of said second variable impedance element modulated by said signal from said modulator output terminal, said second attenuator output terminal feeding said second input terminal of said summing network.

4. The combination as specified in claim 1 wherein said variable attenuator consists of a bridge circuit of four resistors, one of which is the variable impedance element of claim 1, wherein said attenuator input section includes the secondary of a first transformer connected to a first set of opposite corners of said bridge and said output section of said variable attenuator extends from a second set of opposite corners of said bridge, wherein said means for impressing said first pulsating signal on said attenuator includes a primary of said first transformer, said first input section of said summing network includes a primary of a second transformer connected across said second set of opposite bridge corners, said means for feeding modulated signals from said modulator output section to said second summing network input section includes a primary of a third transformer, and said second input section of said summing network includes a secondary winding of said third transformer connected in series with said primary of said second transformer across said second set of opposite bridge corners.

5. The combination as specified in claim 1 wherein said means for impressing a first pulsating electrical signal on said attenuator input section includes a source of direct current energy and a first chopper switch between said source and said attenuator input section, said means for removing pulsating signal components from said electrical signals impressed on said modulator stage input section includes a second chopper switch, said means to modulate electrical signals impressed on said modulator input section includes a third chopper switch, each of said chopper switches having first and second terminals, and means to control said chopper switches to maintain frequency and phase synchronization between said second electrical signal, said demodulator and said modulator.

6. The combination as specified in claim 5 wherein said chopper switches are made up of movable electrical contacts and wherein said chopper switch control means is constituted as an electromechanical structure which physically opens and closes said switches by moving said contacts.

7. The combination as specified in claim 5 wherein at least one of said chopper switches includes first and second sets of two diodes, each diode being connected in series with the other of its set and said sets being connected in parallel with each other at two common points, all four of said diodes being connected to permit forward current flow in the same direction between said two common points, a connection point between diodes of said first set being connected as a first switch terminal in said system, a connection point between diodes of said second set being connected as a second switch terminal in said system, and means for biasing said diodes into forward conduction when said switch is to be closed and biasing said diodes into non-conduction when said switch is to be open.

8. An impedance network system comprising an AC source, summing means having first and second input terminals and a summing output junction terminal, an attenuator network connected between said source and said first input terminal, an AC amplifier having an input and output, the input of said AC amplifier being connected to said summing terminal, means providing a DC output having its input connected to the output of said AC amplifier, and a modulator connected between the output of said DC means and the second input terminal of said summing means.

9. The combination as specified in claim 8 in which said modulator is synchronized with said source.

10. An impedance network system comprising a variable attenuator having an element of variable impedance, an input section and an output section, means for impressing a pulsating electrical signal on said attenuator input section to produce at said output section a second electrical signal which is representative of a function of the impedance of said variable impedance element, a summing network having first and second input terminals and an output terminal, the output section of said attenuator being connected to the first input terminal of said summing network, an AC amplifier having an input circuit fed from the output section of said summing network and having an output circuit, demodulating means having an input section connected to the output circuit of said AC amplifier for demodulating the signal from said AC amplifier, said demodulating means having an output section at which the demodulated signal appears, and modulator means connected between the output section of said demodulating means and the second input terminal of said summing network.

11. The combination as specified in claim 10 in which said modulator means is synchronized with the pulse frequency of said first-mentioned means.

References Cited

UNITED STATES PATENTS

| | | | |
|---|---|---|---|
| 2,805,311 | 9/1957 | Fluegel et al. | 328—3 |
| 3,219,936 | 11/1965 | Eksten et al. | 328—1 |

ROY LAKE, *Primary Examiner.*

NATHAN KAUFMAN, *Examiner.*

UNITED STATES PATENT OFFICE

CERTIFICATE OF CORRECTION

Patent No. 3,354,401 November 21, 1967

Tenny Lode

It is hereby certified that error appears in the above numbered patent requiring correction and that the said Letters Patent should read as corrected below.

Column 1, line 51, for "impedancee" read -- impedance --; column 4, line 5, for "therelative" read -- the relative --; lines 9 and 10, for "44 in the circuit of FIG. 4 is illustrated." read -- 64 which can be substitited for the variable attenuator 44 in the circuit of FIG. 4 is illustrated. --; line 13, for "and 68." read -- and variable resistor 68. --; line 22, for "will then" read -- will, then --; column 5, line 65, for "therewith" read -- therewithin --.

Signed and sealed this 7th day of January 1969.

(SEAL)
Attest:

Edward M. Fletcher, Jr.
Attesting Officer

EDWARD J. BRENNER
Commissioner of Patents